United States Patent
Levi

(10) Patent No.: US 10,836,312 B2
(45) Date of Patent: Nov. 17, 2020

(54) DYNAMIC 360 DEGREE VIEW ACCIDENT AVOIDANCE SYSTEM

(71) Applicant: Avraham Y. Levi, Eagan, MN (US)

(72) Inventor: Avraham Y. Levi, Eagan, MN (US)

(73) Assignee: ROM ACQUISITION CORPORATION, Belton, MO (US)

(*) Notice: Subject to any disclaimer, the term of this patent is extended or adjusted under 35 U.S.C. 154(b) by 0 days.

(21) Appl. No.: 15/984,707

(22) Filed: May 21, 2018

(65) Prior Publication Data

US 2018/0361930 A1 Dec. 20, 2018

Related U.S. Application Data

(60) Provisional application No. 62/521,714, filed on Jun. 19, 2017.

(51) Int. Cl.
*H04N 7/18* (2006.01)
*B60R 1/00* (2006.01)

(52) U.S. Cl.
CPC .......... *B60R 1/00* (2013.01); *B60R 2300/102* (2013.01); *B60R 2300/105* (2013.01); *B60R 2300/303* (2013.01); *B60R 2300/605* (2013.01); *B60R 2300/8026* (2013.01)

(58) Field of Classification Search
CPC ........ B60R 2300/105; B60R 2300/605; B60R 2300/303; B60R 2300/60; B60R 2300/305; B60R 2300/602; B60R 2300/101; B60R 2300/304; B60R 2300/302; B60R 1/00
See application file for complete search history.

(56) References Cited

U.S. PATENT DOCUMENTS

| | | | |
|---|---|---|---|
| 9,535,423 B1 | 1/2017 | Debreczeni | |
| 2008/0310720 A1* | 12/2008 | Park | G06T 7/73 382/181 |
| 2013/0342363 A1* | 12/2013 | Paek | G08G 1/0962 340/901 |
| 2015/0217692 A1* | 8/2015 | Yanagawa | B60R 1/00 348/118 |
| 2017/0096106 A1* | 4/2017 | Higuchi | B60R 1/00 |
| 2017/0132480 A1* | 5/2017 | Han | H04N 5/247 |
| 2018/0122078 A1* | 5/2018 | Polavarapu | G11B 27/031 |

OTHER PUBLICATIONS

Masakatsu Kourogi et al., Real-Time Image Mosaicing From a Video Sequence, article, Waseda University, School of Science and Engineering, 1990, pp. 133-137.

Mateusz Brzeszcz et al., Real-Time Construction and Visualisation of Drift-Free Video Mosaics From Unconstrained Camera Motion, artice, Journal of Engineering, Feb. 2, 2015, pp. 1-12.

\* cited by examiner

*Primary Examiner* — Fabio S Lima

(74) *Attorney, Agent, or Firm* — Thomas J. Nikolai; DeWitt LLP

(57) ABSTRACT

Vehicle safety is enhanced by providing a video system incorporating multiple cameras providing separate video feeds that are stitched together by a controller to provide a composite video viewable by the operator that changes in real time along with changes to the speed and direction of the vehicle.

6 Claims, 13 Drawing Sheets

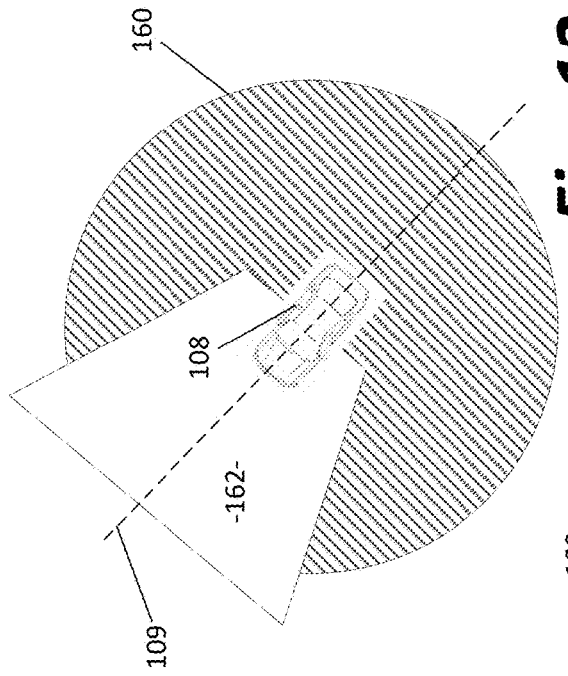
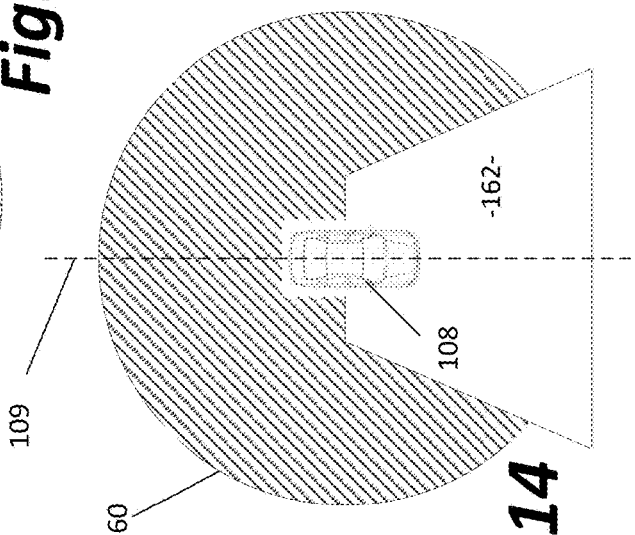
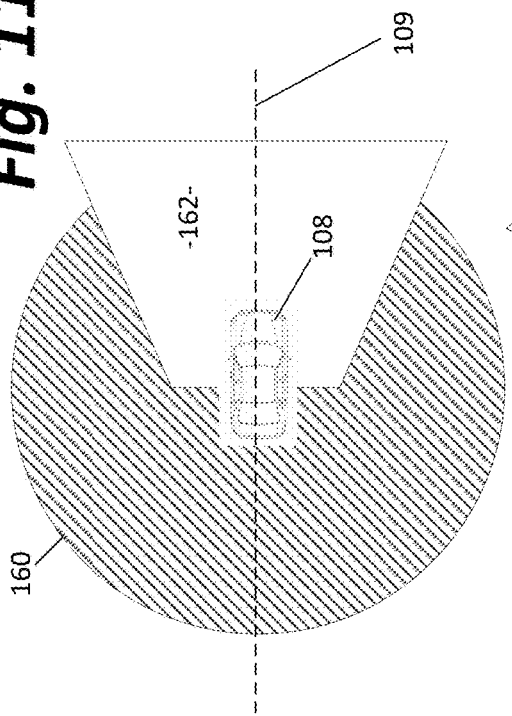
Fig. 11
Fig. 12
Fig. 13
Fig. 14

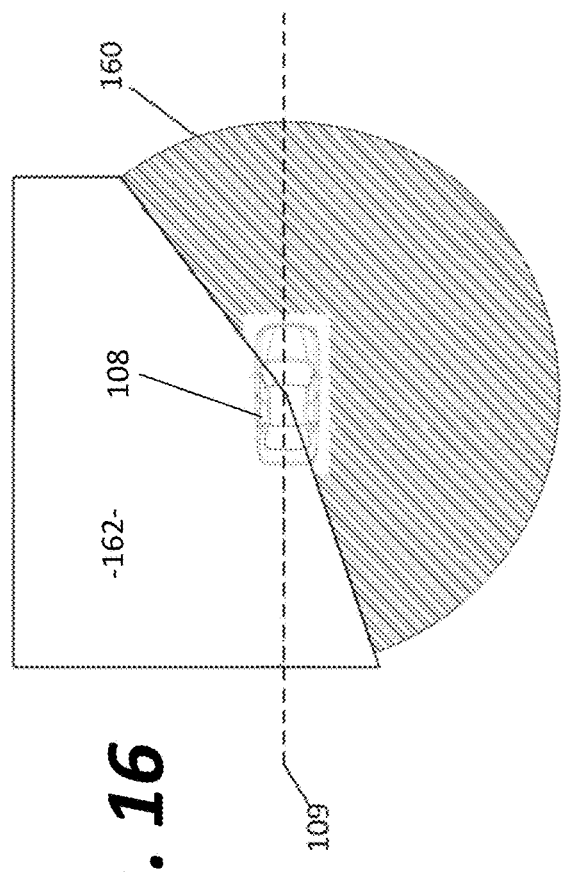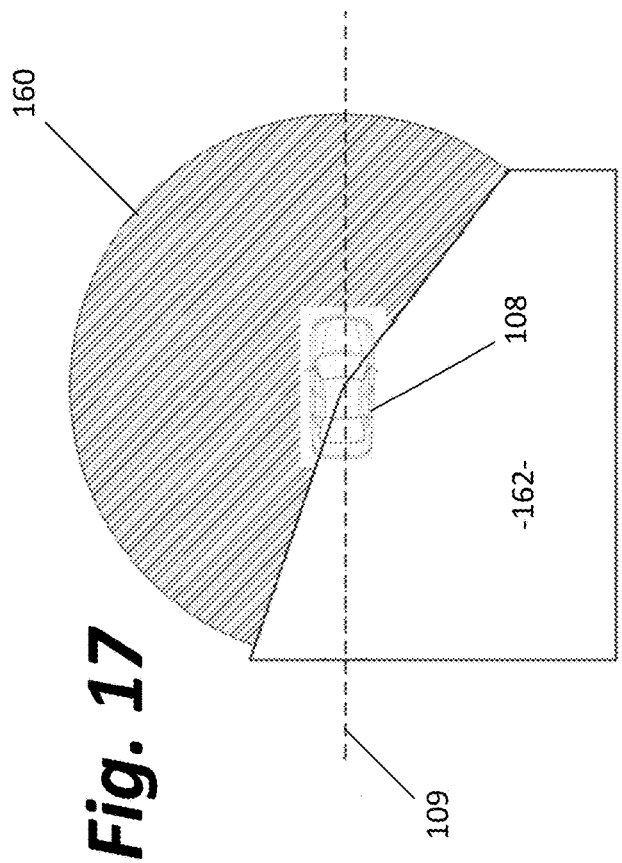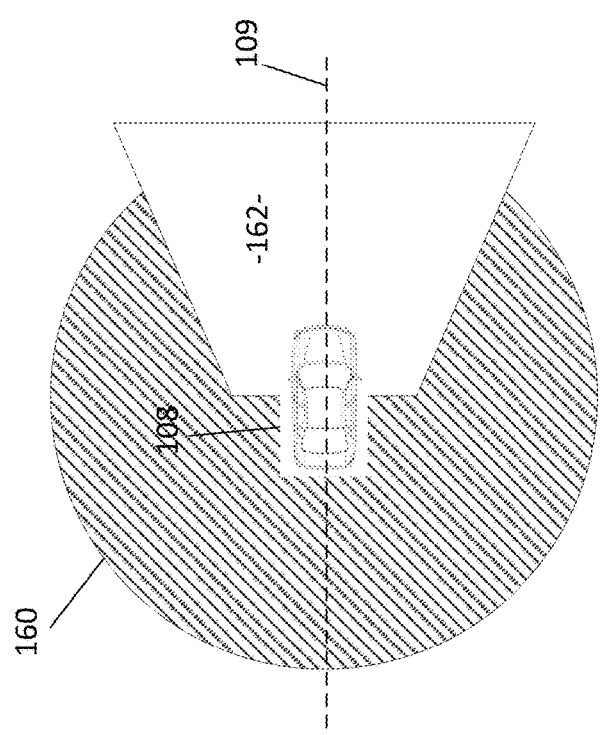

DYNAMIC 360 DEGREE VIEW ACCIDENT AVOIDANCE SYSTEM

CROSS-REFERENCED TO RELATED APPLICATIONS

This application is a non-provisional application of Application No. 62/521,714, filed Jun. 19, 2017, and claims priority from that application which is also deemed incorporated by reference in its entirety in this application.

STATEMENT REGARDING FEDERALLY SPONSORED RESEARCH OR DEVELOPMENT

Not applicable

BACKGROUND OF THE INVENTION

I. Field of the Invention

The present invention relates to accident avoidance systems for vehicles. More specifically the present invention relates to accident avoidance systems for vehicles which incorporate a plurality of cameras sending signals to a display located within viewing range of the driver of the vehicle.

II. Description of the Prior Art

In recent years, many cars and trucks have been equipped with accident avoidance systems. Typically, these accident avoidance systems comprise one or more video cameras mounted to the exterior of the vehicle which transmit signals to a signal processor, and a display within the vehicle viewable by a vehicle operator to which video signals from the video processor are received and displayed. When multiple cameras are employed, a switching mechanism is also typically part of the system. For example, when the vehicle is shifted into reverse, the switching mechanism may cause video signals generated from a camera on the back of the vehicle to be displayed on the display. In some cases, the display also includes reference lines generated by the system to show a projected path of the vehicle and various distances from the rear of the vehicle. When one of the turn signals is activated, the display may also be switched to the feed from a camera associated with a side of the vehicle. For example, the feed from a camera associated with the right side of the vehicle may be displayed when signaling a right turn and the feed from a camera associated with the left side of the vehicle may be displayed when signaling a left turn.

Various limitations exist with respect to currently available accident avoidance systems. One limitation is that the operator only sees on the display the images being generated by a single video camera. While the system can switch between cameras, a dynamic integrated representation created using the feed from multiple cameras is not generally available.

Another limitation arises from the desire to capture as wide an image as possible for display from a single camera. To address this desire, cameras equipped with very wide-angle lenses are typically employed. Such wide-angle lenses tend to suffer from lens aberration which distorts the video feed making it difficult for a vehicle operator to quickly look at and interpret what is being shown on the display if the entirety of the images captured are displayed. Some systems attempt to overcome lens distortion and image aberration issues by cropping the video images and displaying only a selected portion of each of the images captured as part of the video feed. While this makes it easier for the operator to interpret what is displayed, much of the available information is not provided to the operator by the display because of the cropping.

A third limitation of current systems is that they are generally unable to display a 360-degree view around the vehicle. Operators would benefit from being able to see all around the vehicle such as when parking or changing lanes. Generally systems able to display a so-called "birds-eye" view of the vehicle only do so when the switching system selects for display the feed from the camera providing the "birds-eye" view to the exclusion of the feeds from the other cameras. In some "birds-eye" view implementations, feeds from multiple cameras are employed. In these implementations, "birds-eye" view is only useful at very low speeds. At even moderate speeds, the video is very distracting to the driver and overly difficult for the driver to interpret.

A fourth limitation is that such systems are not adaptive based on the speed and direction of the vehicle. The information most useful to an operator is often dependent on the speed and direction of the vehicle.

SUMMARY OF THE INVENTION

All of the limitations discussed above are overcome by providing a multi-camera system that analyzes the speed and direction of travel of the vehicle (i.e., the vehicle's vector), stitches together the feed from a plurality of cameras, and in an adaptive manner based on the vehicle's vector and changes thereto transmits a vector-based video feed that is displayed on a video display viewable by a vehicle operator.

More specifically, in real time:
  a video processor continuously analyzes the speed and direction of the vehicle to determine the vehicle's vector,
  video signals from multiple cameras are stitched together to render an integrated composite video feed which may be either a 360-degree horizonal stitched composite (i.e., a stitched composite extending to the visible horizon in all directions from the vehicle) from which portions are then selected based on the vehicle's vector, or a stitched composite of portions of the raw video feed selected based on the vehicle's vector, and
  the integrated vector-based video feed is delivered to the display where the integrated video is displayed to the vehicle operator.

Signals indicative of speed and direction can be provided to the video processor in several ways. Many modern vehicles have an on-board computer that calculates the speed and direction at which the vehicle is traveling from mag-pickup or hall effect sensors such as quadrature sensors and non-contact magnetic sensors that measure the distortion of magnetic fields and thus provide precise measurements of speed and direction. Either the calculated speed or the unprocessed signals from the sensors can be forwarded to the video processor by the on-board computer. Alternatively, speed and direction of the vehicle can be determined from the video feeds received by the video processor from the cameras.

The video processor also receives, in real time, a video feed from each of the cameras. The cameras have overlapping fields of view. Care must be taken when selecting and arranging the cameras to ensure this is the case.

Timing signals may be imbedded in video feed from each camera to assist in calibration and synchronization of the video feeds during the stitching process. The stitching process turns the separate individual video feeds from each camera into a single, high-resolution, seamless panoramic video. Not only is synchronization of timing important, but synchronization of exposure, white balance, focus distance and depth of field may be required to generate a usable composite video. Likewise, since the cameras are not stationary and the vehicle on which the cameras are mounted is subject to substantial vibration as the vehicle travels down the road, the system ideally employs features tending to minimize the effects of vibration in the various video feeds. These may include camera mounts that reduce vibration, cameras incorporating multi-axis image stabilization features, and anti-vibration protocols employed as the video feeds are processed and stitched together. Otherwise, the composite video created by the stitching process will be unwatchable. A video controller, together with its software, can address the video feeds from such cameras so that composite video delivered to the vehicle's display is clear and provides information useful to the operator.

As noted above, the video processor either dynamically modifies the stitching together of the individual video feeds based on the direction and speed of the vehicle or dynamically selects portions of a 360-degree horizonal stitched composite based on the speed and direction of the vehicle. Regarding the direction component of the vehicle's vector, either the stitch pattern or portion selected of a 360-degree horizonal stitch composite is modified as direction changes to always present on the display a composite video feed (i.e., vector-based video) having larger portions from the video camera(s) aimed in the direction of travel of the vehicle and smaller portions from other cameras. Regarding the speed component of the vehicle's vector, as the speed increases, the stitching pattern (or selected portion of a 360-degree horizonal stitch composite) is modified to provide a longer distance view in the direction of travel and, as speed decreases, the stitching pattern (or selected portion of a 360-degree horizonal stitch composite) is modified to provide the vector-based video with a shorter distance view.

A graphical image of the vehicle can also be embedded in the vector-based video presented on the display. This is done to show the operator exactly where the vehicle is located with reference to the surrounding environment at any given point in time as the vehicle is moving through the environment. Due to modulation of the stitch pattern or selected portion of a 360-degree horizonal stitch composite, the vector-based video presented on the display will be as if a camera above the vehicle is gradually moving to the rear of the vehicle as the speed of the of the vehicle in the forward direction increases. All of this will appear seamless to the user. Likewise, when parking, changing lanes or otherwise maneuvering the vehicle, the operator can see objects located in any direction from the vehicle that may present a hazard.

DESCRIPTION OF THE DRAWINGS

The foregoing features, objects and advantages of the invention will become apparent to those skilled in the art from the following detailed description of a preferred embodiment, especially when considered in conjunction with the accompanying drawings in which like numerals in the several views refer to corresponding parts.

FIGS. 11-14 are representations showing a 360-degree horizonal stitched composite video and portions of that video that are displayed as the vehicle moves in various directions;

FIGS. 15-17 are schematic diagrams illustrating a 360-degree horizonal stitched composite video and portions of that horizonal stitched composite video displayed when the processor detects the vehicle is traveling straight, turning left, and turning right;

DETAILED DESCRIPTION

Figure 1:
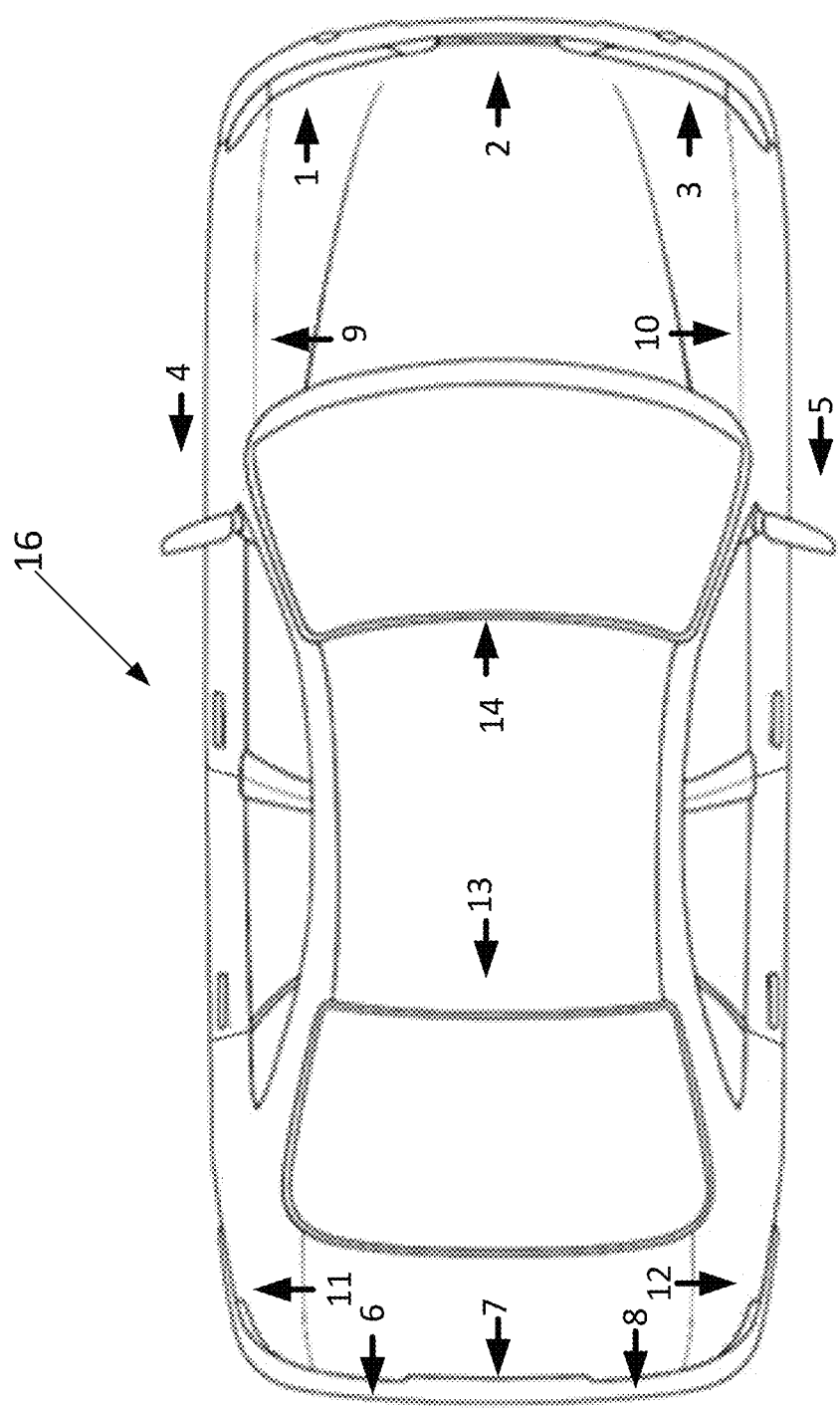
FIG. 1 is a diagram showing a vehicle and the placement a plurality of video cameras mounted to the vehicle.

FIG. 1 shows the location of fourteen different cameras 1-14 mounted to a vehicle 16 and by the arrows the direction in which the lenses of the cameras are pointed. Cameras 1-3 and 14 point forward of the vehicle. Cameras 4-8 and 13 point rearward of the vehicle. Cameras 9 and 11 point to the left (driver) side of the vehicle and cameras 10 and 12 point to the right (passenger) side of the vehicle. While fourteen cameras are shown, either a smaller number or a larger number of cameras may be used when implementing the invention.

Figure 8:
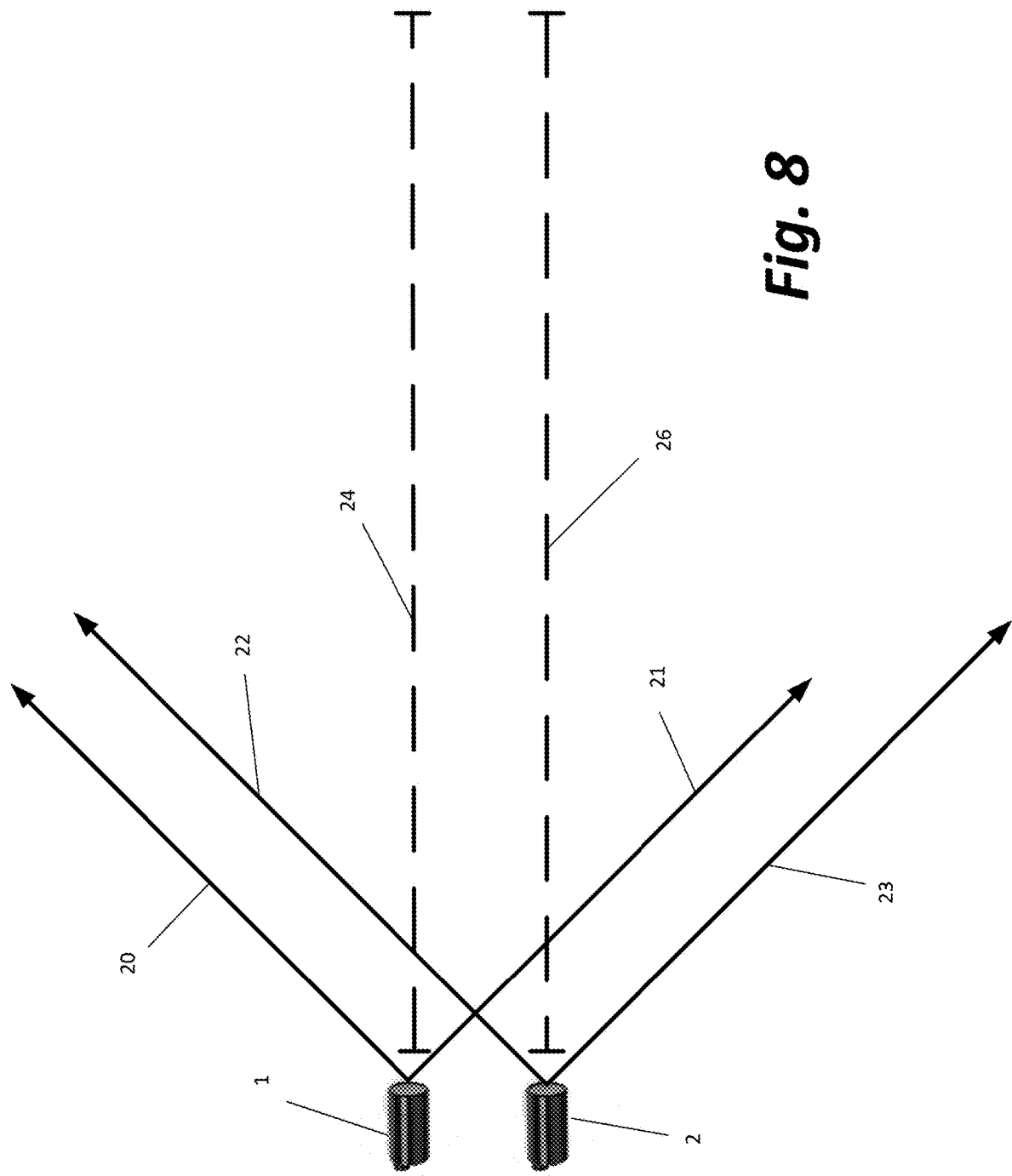
FIG. 8 is a schematic diagram showing the field of view and depth of field of two cameras.

Cameras 1-14 are each capable of capturing and delivering video in real time at a rate of 20 to 30 frames per second. The cameras typically incorporate wide angle, fixed focal length lenses which offer a field of view in the range of 70 to 180 degrees measured horizontally. When fewer cameras are used, the field of view of the lens of each camera will preferably be toward the wider end of this range. When more cameras are used, the field of view of the lenses may be narrower. In FIG. 8, the camera 1 has a 90-degree field of view as illustrated by lines 20 and 21 and camera 2 also has a 90 degree field of view as represented by lines 22 and 23. Note that the fields of view of the two lenses 1 and 2 overlap. This will be the case with all of the adjacent cameras mounted on the vehicle to provide full 360 degree coverage without distortion.

The camera and lens should also be selected to provide a long depth of field (i.e., the area that will be in focus) as reflected by lines 24 and 26 in FIG. 8. This is generally achieved by using a camera/lens combination providing a small image sensor, a small focal length (e.g. 2.8 mm) and a small aperture (e.g., f8 or above). Since the aperture controls the amount of light entering the camera, larger apertures may be used if the sensor size and focal length are sufficiently small. The cameras selected may automatically control the brightness and contrast of the video produced. Ideally, the video feeds of all cameras will be of substantially the same brightness and contrast.

The cameras 1-14 (FIGS. 1 and 2) are also capable of generating quality video in bright daylight and have an infrared (IR) mode for producing quality video at night. In the normal operating mode, the cameras should be able to capture images at a minimum illumination of at least 0.5 lux. In the IR mode, the camera should be able to capture images down to 0 lux. Switching between the normal and IR modes is preferably automatic. Each camera may also have IR LEDs surrounding the lens to enhance the ability of the lens to capture images in very dark conditions. This is particularly true for the cameras 9-12 which are directed toward areas to the sides of the vehicle which generally are not illuminated by the vehicle's headlights or tail lights. An array of IR LEDs able to cast light out to about 25 feet should be more than adequate for this purpose.

Figure 2:
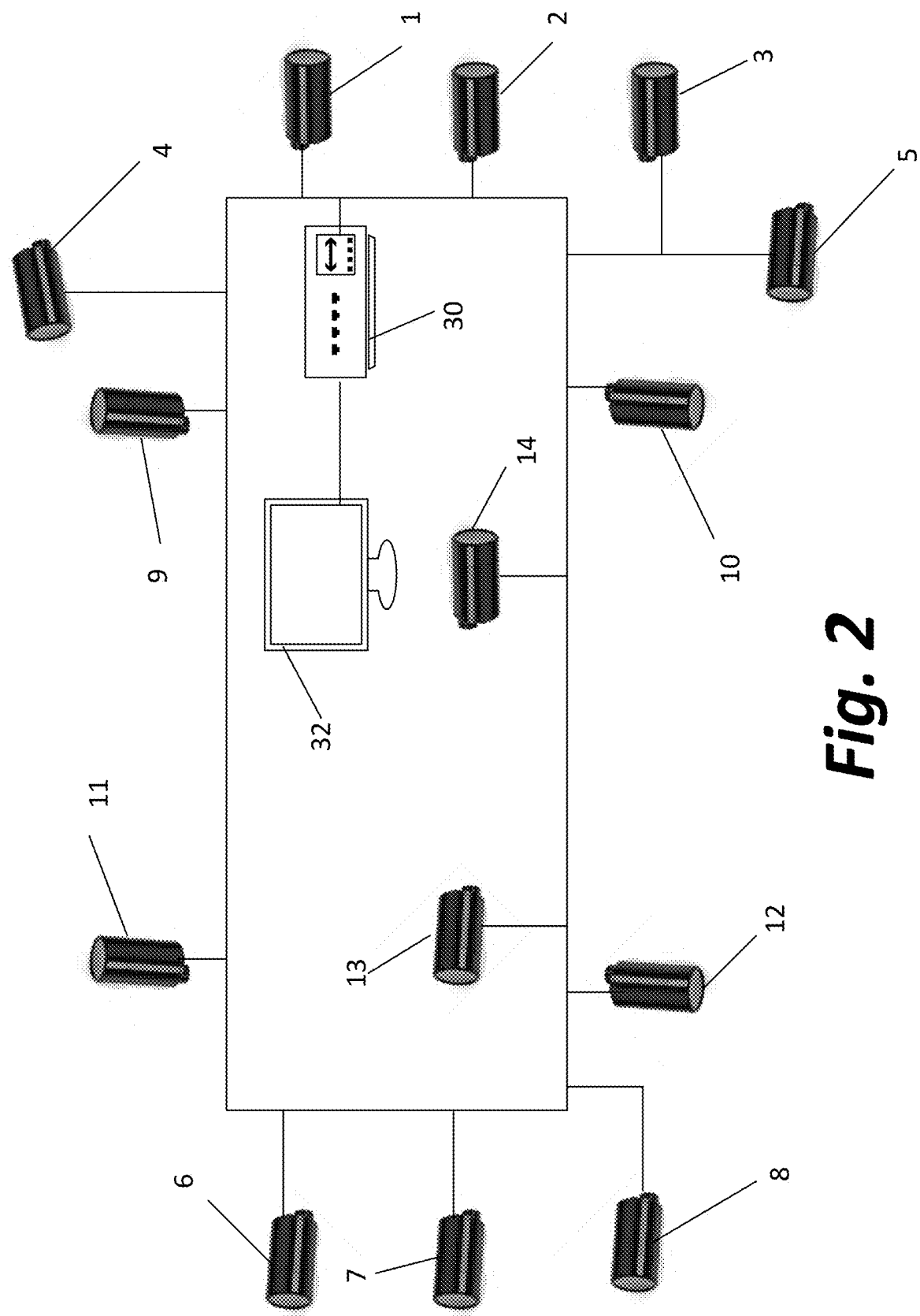
FIG. 2 is a schematic diagram showing the components of the video system of the vehicle.

Each camera must be able to send a raw video stream (feed) to a video processor. This may be done using hard wired connections as illustrated in FIG. 2. When a hard-wired connection is used, each of the cameras will, for example, include a RJ45 10/100 Mbps port (or some other suitable port) adapted to create a wired connection able to transmit video data at a suitable rate to a controller 30 having a built in switch or multiplexer allowing the controller to receive video from all of the cameras simultaneously. Alternatively, the video feed may be sent from the cameras to the controller wirelessly. This may be done in accordance with the IEEE 802.11 b/g/n standard with data rates as high as 150 Mbps. For automobiles, Bluetooth (as opposed to Wi-Fi) may also be used. Non-standard communications protocols may also be employed without deviating from the invention.

The controller 30 is adapted to receive and process the video signals from each of the cameras. The controller 30 includes a CPU, read only and random access memory, a display controller card for controlling the display 32, and some storage. The CPU selected, and amount of memory employed, will depend in the number of cameras used. These resources must be sufficient to receive and process the video data from the cameras in real time. The more cameras and the higher the resolution of individual raw video streams from the cameras, the more processing power and memory will be required for the controller 30. The amount of storage will depend on how much of the video will be stored by the system and whether the system will store the unprocessed video from the individual cameras or only portions of the composite video stream produced from the unprocessed camera video streams by the controller 30. In most cases, it will only be desirable to store a small portion of the video, e.g., the most recent 30 seconds to five minutes of video. It is possible to store hours of video if that is desired, but only if sufficient storage capabilities are built into the controller.

Figure 3:
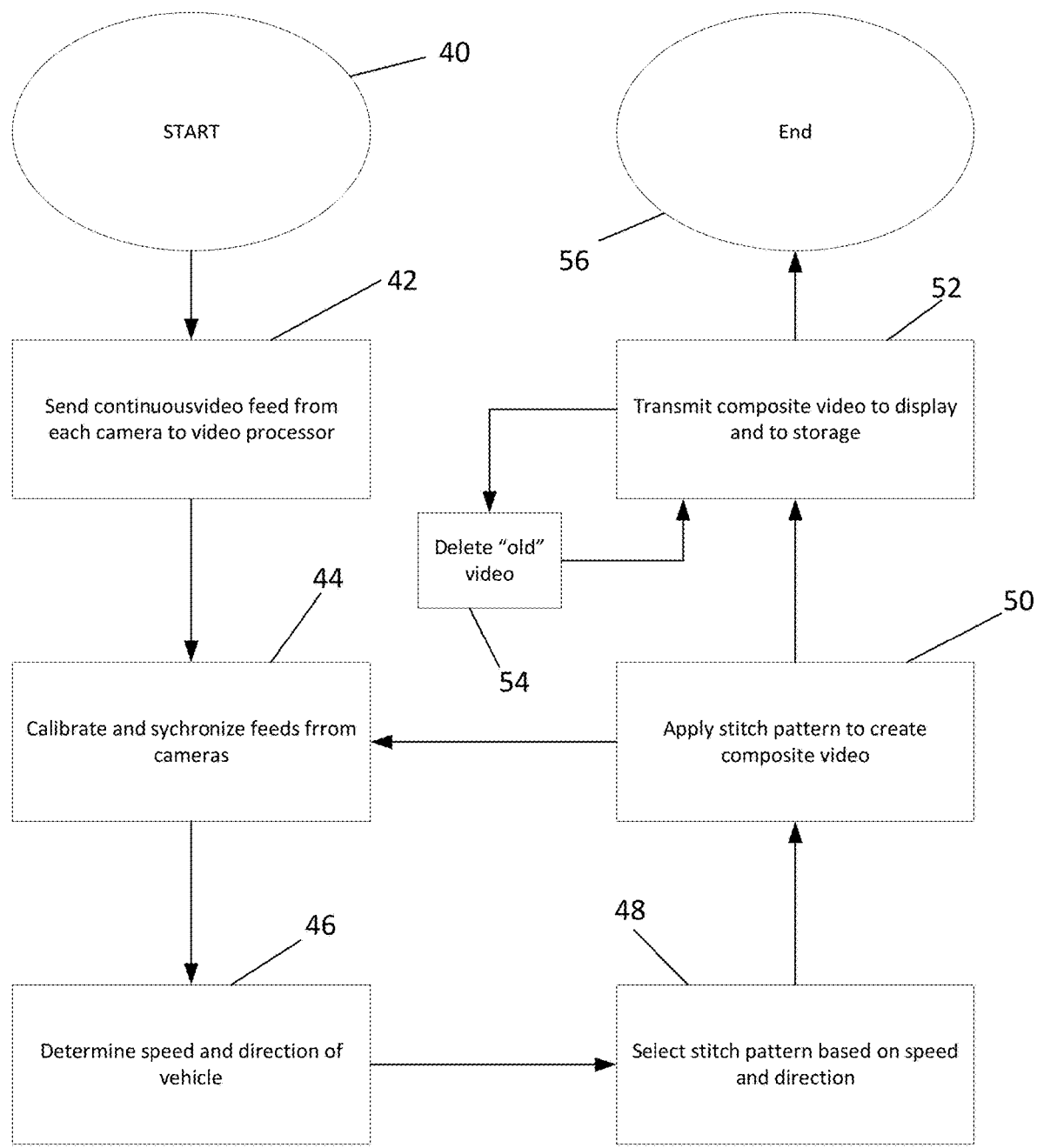
FIG. 3 is a flow chart showing the process for creating the composite video.

Processing of the video will now be discussed with reference to FIG. 3. At step 40, the vehicle is started. This causes the controller 30 and each of the cameras 1-14 to boot up. After the boot up process is completed, a data quality check is performed to ensure that each of the cameras 1-14 are communicating properly with the controller 30. The cameras 1-14 then each begin to generate and send to the controller 30 a continuous raw video feed at step 42. The raw video feed from each camera is ongoing and continuous until the vehicle is turned off at step 56.

At step 44, the video controller 30 continuously calibrates and synchronizes the raw video feed from each of the cameras. This is done with respect to time and is also done with respect to at least the brightness and contrast of the individual video feeds to ensure that the video data is synchronized with respect to time and to ensure that each frame of the composite video ultimately produced from the individual video feeds will generally be consistent in terms of brightness and contrast. Harsh, bright lights shown in the raw video are also processed to appear dimmer. Each of the individual raw video feeds may include time stamps or other timing signals to assist the controller in the synchronization process. The data feed for each camera will also be uniquely identified and the controller is programmed to know how and where the cameras are arranged on the vehicle. Additional calibrating and synchronization can occur without deviating from the invention.

At step 46, the speed and direction of the vehicle are ascertained by the video controller 30 to determine the vehicle's vector. This can be done by sending speed and direction signals from the vehicle's onboard computer if the onboard computer is used to calculate speed and direction of the vehicle. Alternately, data in the video data feeds can be used for this purpose by the controller. Likewise, signals from sensors such as a speedometer and compass may be used. Signals from a ground positioning system (GPS) device mounted in the vehicle may also be used for this purpose.

At step 48, and based on the speed and direction of the vehicle (the vehicle's vector) ascertained at step 46, the controller selects a stitch pattern to be applied to the unprocessed video feeds being received from each of the cameras. The stitch pattern selected will emphasize the area in the direction the vehicle is traveling and will be adjusted based on the vehicle speed.

At step 50, the selected stitch pattern is applied to the unprocessed video feeds to create a composite video stream. At step 52, the composite video is transmitted to the vehicle display 32 and, if desired, saved in storage. As mentioned above, video is only stored for a preselected time period. After that time period has expired, the old video is deleted from storage at step 54. This frees up storage space for new video to be saved as it is processed by the controller. New video is continuously added to storage as old video is deleted so long as the system is operating. More specifically, the controller is adapted to store the individual frames of the composite video (or in some cases unprocessed video) sequentially such that each frame is stored for a predetermined period of time and then deleted from storage.

The steps described above proceed continuously in real time so that real-time video is presented to the vehicle operator on the display 32. This continues until the vehicle is shut off at step 56. More specifically, when the vehicle is shut off, the controllers and cameras are either turned off completely or switched into a low power sleep mode until the vehicle is started again.

As indicated above, the stitch pattern will be selected based on the speed and direction of the vehicle, i.e., the vehicle's vector. As such the composite video created for display may be referred to as vector-based video. FIGS. 4-7 show images created using different stitch patterns when the vehicle is moving forward, but at increasing speeds. If the vehicle were traveling in reverse or turning, other stick patterns would be used.

Figure 4:
FIG. 4 is a representation of a displayed image of a stitched composite video when the vehicle is moving slowly.
Figure 5:
FIG. 5 is a representation of a displayed image of a stitched composite video when the vehicle is moving at a moderate speed.
Figure 6:
FIG. 6 is a representation of a displayed image of a stitched composite video when the vehicle is moving at a greater speed than the moderate speed represented in FIG. 5.
Figure 7:
FIG. 7 is a representation of a displayed image of a stitched composite video when the vehicle is moving at highway speeds.

FIG. 4 is a representation of a displayed image of a stitched composite video when the vehicle is moving very slowly. In FIG. 5, the vehicle is moving at a moderate speed. Because of the change in stitch pattern used, the image is more to the rear of the vehicle and less over the top of the vehicle in FIG. 5 than in FIG. 4. The image of the vehicle is a virtual representation of the vehicle, but the remainder of the image when the invention is used is stitched together video of the actual surrounding terrain. In FIG. 6, still a different stitch patter has been used because the vehicle is moving at a greater speed than the moderate speed represented in FIG. 5. Even more of the rear of the vehicle and more of the area in the front of the vehicle is shown because of the stitch pattern selected. In FIG. 7, the stitch pattern used was selected because the vehicle is moving at highway speeds. A significant area behind and to the sides of the vehicle is visible as is a significant area covering a large distance in front of the vehicle. All of these different views (and more) are able to be created from the individual video feeds using available stitch patterns selected in real time based on vehicle speed and direction.

The stitch patterns, and thus the perspective of the composite vector-based video, are constantly changing as the vehicle changes speed and direction. Likewise, the stitch pattern replaces distorted portions of one video stream with undistorted portions of a second video stream including the same terrain as part of the stitching process. Thus, the composite vector-based video sent to the display is distortion/aberration free.

To achieve the highest quality video, the cameras should be positioned so their view is not blocked by obstruction. This is typically achieved by mounting the cameras high on the vehicle. As such, the system of the present invention is employed on taller vehicles, such as buses, trucks, SUVs and vans, on which cameras can be mounted at a height above most of the surrounding traffic. Cameras can also be mounted to roof top accessories such as roof racks to increase the height of the cameras. For example, many commercial vans are equipped with ladder racks mounted to the roof. Cameras mounted to such racks are particularly advantageous.

FIGS. 9-21 illustrate another embodiment of the invention. In this embodiment, the video controller comprises two controllers—a camera controller 110 and a display controller 130. This arrangement provides distributed processing and is particularly advantageous when retrofitting a vehicle with the system of the present invention.

Figure 9:
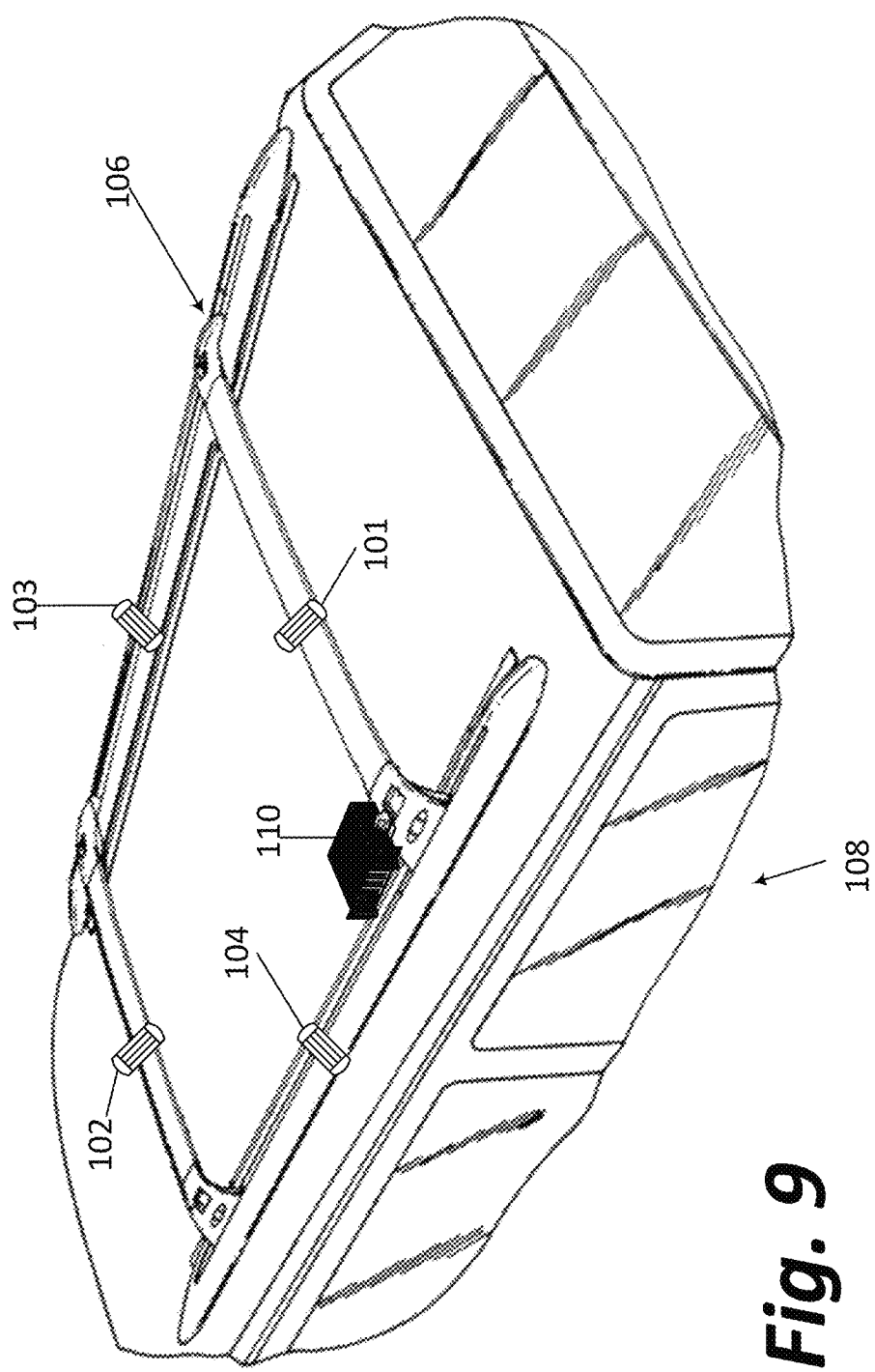
FIG. 9 is a partial perspective view of a vehicle having a roof rack to which four cameras and a camera controller have been mounted.

In FIG. 9, four cameras 101, 102, 103 and 104 mounted to the roof rack 106 of a vehicle 108. Camera 101 is aimed toward the front of the vehicle 108 and captures an image in front of the vehicle that extends all the way to the visible horizon. Camera 102 is aimed toward the rear of the vehicle 108 and captures an image extending from the rear of the vehicle all the way to the horizon. Cameras 103 and 104 are aimed toward opposite sides of the vehicle 108 and capture an image extending to the horizon in the direction in which they are aimed.

As illustrated in FIGS. 1 and 2, more cameras can be added. These can be mounted to the roof rack 106 as shown in FIG. 9 or to other parts of the vehicle 108, as shown in FIG. 1.

Figure 10:
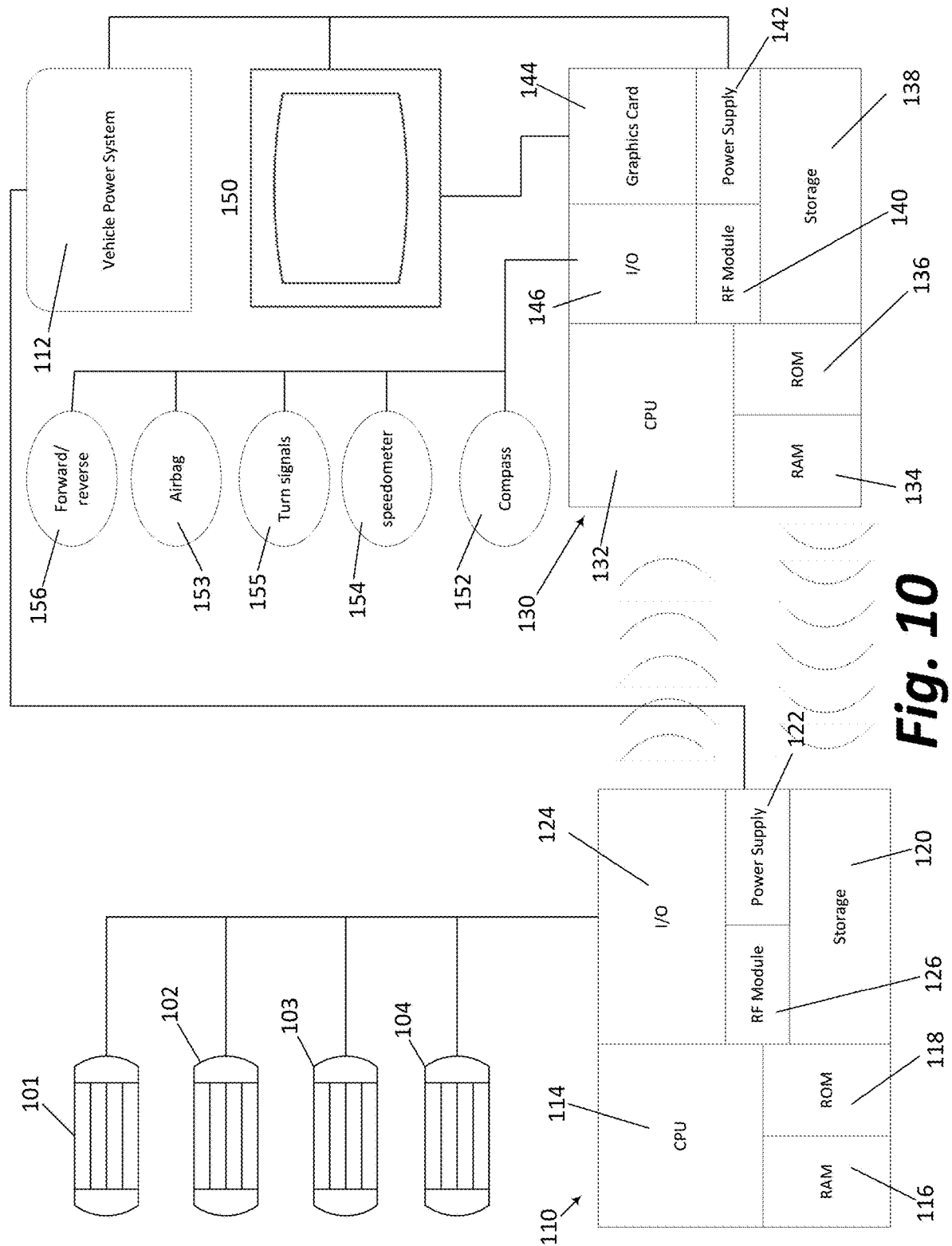
FIG. 10 is a schematic diagram of the cameras and a video controller (comprising the camera controller of FIG. 9 and a display controller) adapted to receive signals from various sensors and control a video display located inside the vehicle and viewable by a driver.
Figure 18:
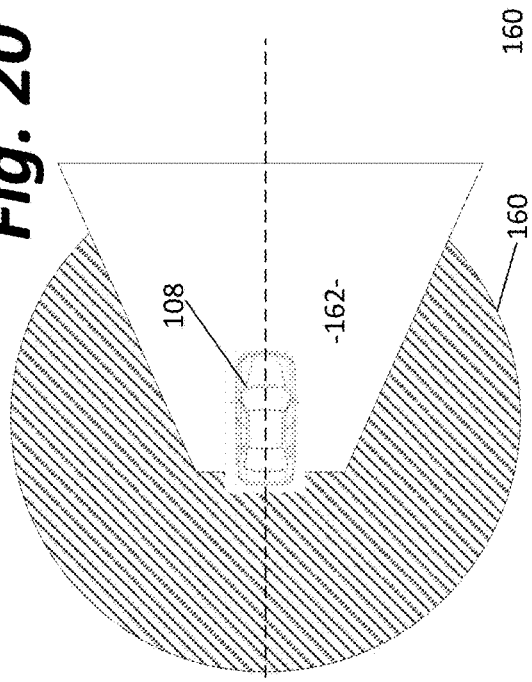
FIGS. 18 and 19 are diagrams illustrating the portions of a 360-degree horizonal stitched composite video that are selected when the vehicle is stopped or moving slowly, and the vehicle is either in drive or reverse.

Also mounted to the roof rack 106 is the camera controller 110. Typically, a hard wired connection, as shown in FIG. 10, is made between the camera controller 110 and each of the cameras 101-104. This wired connection carries control signals from the camera controller 110 to the cameras 101-104 and raw video streams and other data signals from the cameras 101-104 to the camera controller 110. This wired connection also supplies electrical power from the camera controller 110 to the cameras 101-104. The camera controller 110 typically receives electrical power via a wired connection to the vehicle's power system 112, as shown in FIG. 10.

The camera controller 110 has a central processing unit (CPU) 114 and a memory module comprising random access memory (RAM) 116 and read-only memory (ROM) 118. The camera controller 110 also includes a storage module 120 comprising at least one storage device. The storage device can be a hard drive or a solid state storage device (SSD). While the hard drive may be used without deviating from the invention, SSDs are preferred. SSDs are not prone to mechanical failure like hard drives, are typically faster in terms of read-write speed than hard drives, and are available in configurations that provide sufficient storage. If more storage is required, multiple SSDs (or hard drives) may be employed.

As mentioned above, the camera controller 110 is coupled to the vehicle's power system 112. More specifically, the camera controller 110 has a power supply 122, which receives electrical power from the vehicle's power system 112. The camera controller 110 (and cameras) may also be independently powered by rechargeable batteries that are coupled to and recharged by a electricity producing solar generator or wind turbine mounted to the vehicle.

As also mentioned above, the camera controller 110 communicates with the cameras 101-104. When such communication is via a hard-wired connection, the camera controller 110 has an input/output interface 124 that has multiple ports. Interface 24 also includes switching or multiplexing capabilities so that the video feed from each camera is received and processed simultaneously in real time. The ports can be Ethernet ports, USB ports, RJ45 10/100 Mbps ports, Thunderbolt ports or any other suitable port able to transfer at least data and video signals between the camera controller 110 and the cameras 101-104. Preferably, the port also is able to supply electrical power through the hard wired connection to the cameras 101-104.

As illustrated in FIG. 10, the camera controller 110 also includes an RF module 126. RF module 126 is capable of transmitting and receiving radio signals. The RF module 126 may, for example, be equipped to transmit and receive radio signals in accordance with the IEEE 802.11b/g/n standard. Bluetooth, as opposed to Wi-Fi may also be used. Likewise, non-standard wireless communications may be used without deviating from the invention.

While the RF module 126 can be used to communicate with the cameras 101-104, if the cameras are similarly equipped with a compatible RF module, the primary purpose of the RF module 126 is to communicate with the display controller 130 which is mounted inside the vehicle along with display 150. The display controller 130 has a compatible RF module 140 such that data and video signals can be transferred via extremely short range radio between the camera controller 110 and the display controller 130.

As further illustrated in FIG. 10, the display controller 130 has a CPU 132, a memory module including RAM 134 and ROM 136, a storage 138, a power supply 142, a graphics card 144, which drives display 150, and an input/output module 146. The power supply 142 receives power from the vehicle's power system. The input/output module is adapted to receive signals from various sensors. As shown in FIG.

10, these sensors include a compass 152 that provides information related to the direction of the vehicle; a speedometer 154 that provides information related to the speed of the vehicle; a turn signal sensor 155 that sends signals to the controller indicating whether no turn signal is engaged, the right turn signal is engaged or the left turn signal is engaged; an airbag sensor 152 which sends a signal to the controller if the airbag is deployed due to an accident; and a forward/reverse sensor which sends a signal to the display controller indicating whether the vehicle is in park, in a forward gear or in reverse. The sensor array comprising sensors 152-156 is exemplary. Modern vehicles have a plurality of sensors that are fed into an onboard vehicle computer. Outputs from this computer may be used instead of the specific sensor array provided. Further, additional or fewer sensors may be employed without deviating from the invention.

The primary function of the camera controller 110 is to collect video signals from each of the cameras 101-104 and, in real time, stitch them together to form a 360-degree horizonal stitched composite video feed. The circle 160 in FIGS. 11-21 represent this 360-degree horizonal stitched composite video feed. The boundary defined by the circle 160 is the visible horizons surrounding the vehicle 108 at its current position. The circle 160 will move with the vehicle as the vehicle travels along roads, highways or any other terrain.

As the 360-degree horizonal stitched composite video is created, it is stored in storage 120 such that the most recent desired portion of the 360-degree horizonal stitched video feed (e.g., the most recent 30 seconds) is available. Also, a selected portion of the 360-degree horizonal stitched video composite is displayed on display 150, as described in further detail below.

The portion of the 360-degree horizonal stitched video composite selected and displayed on display 150 is automatically controlled by the system illustrated in FIG. 10 based on signals received from the various sensors 152-156. As such, a driver need not manipulate any controls whatsoever to utilize the system. The video delivered to the display 150 is vector-based video. This is because the vector of the vehicle is used to select what is displayed. Video is vector-based video whether the selection is made when creating the composite video as described above with reference to FIGS. 1-8 or after creating a 360-degree horizonal video composite and selecting a portion of the composite to be displayed as occurs with the embodiment of FIGS. 9-20.

At least the direction and speed of the vehicle, (i.e., the vehicle's vector) are used by the control system to make the selection used to create the vector-based video feed.

What is displayed on display 150 will change based on the direction in which the vehicle is traveling. In the embodiment illustrated in FIG. 10, the compass 152 is constantly sending signals to the display controller 130. As signals are received by the display controller 130, those signals are processed by the CPU 132 to formulate commands that are transmitted by the RF module 140 to the RF module 126 of the camera controller 110. CPU 114 of camera controller 110, in response to such commands, then selects the portion of the 360-degree horizontal stitched composite video responsive to the command and transmits a video stream of the selected portion (vector-based video) via RF module 126 to RF module 140. The display controller CPU 132 then instructs the graphics card 144 to output the vector-based video stream to the display 150. As the direction of the vehicle changes, commands are sent by the video controller 130 to the camera controller 110 and the portion of the 360-degree horizonal stitched composite used to create the vector-based video forwarded back to the display controller 130 is adapted accordingly.

What specifically occurs based on signals generated by the compass sensor is illustrated by FIGS. 11-14. FIG. 11 is a representation of a vehicle traveling in an easterly direction. Based upon the direction of the vehicle, the trapezoidal portion 162 of the 360-degree horizonal stitched video 160 is used to create the vector-based video displayed. FIGS. 12-14 illustrate how the selected portion 162 shifts if the vehicle, rather than traveling east, travels in a different direction. In FIG. 12, the vehicle 108 is traveling northwest. In FIG. 13, the vehicle is traveling northeast. In FIG. 14, the vehicle is traveling south. In each example provided by FIGS. 11-14, the portion 162 selected of the 360-degree horizontal stitched composite and vector-based video displayed is essentially bisected by an imaginary line 109 that extends longitudinally through the center of the vehicle.

The portion 162 of the 360-degree horizonal stitched composite 160 selected to create the vector-based video displayed on display 150 may also be altered based on actual changes (or anticipated changes) in direction. Signals indicative of actual changes in direction may be provided by a compass, gyroscope, 3D accelerometer, GPS unit or the like mounted on the vehicle. Likewise, a GPS unit, when coupled to a map-based route guidance system, may provide signals related to anticipated changes in direction based on the vehicle's position along a route that that been established and mapped by the route guidance system using inputs from the vehicle's operator with respect to destination and inputs from the GPS/map guidance system about the route (and position alone the route) being traveled to the destination. Such signals may also be generated by operation of the turn signals, but when employed as a stand-alone option, this is a less elegant option than when combined with the others described above because vehicles often change directions in the absence of operation of the turn signals by the vehicle's operator, such as when the vehicle is traveling (or about to travel) around a curve in the road. As illustrated in FIGS. 15-17, when signals are sent to the display controller 130 indicative of a change (or anticipated change) in the direction of the vehicle, the display controller 130 processes those signals to change the commands being sent to the camera controller 110. The CPU 114 of camera controller 110 processes those signals to select a different, responsive portion 162 of the 360-degree horizonal stitched composite 160 to transfer back as vector-based video to the display controller 130. The CPU of the display controller then issues commands to the graphics card 144 to display the incoming vector-based video stream on the display 150.

In FIG. 15, the vehicle 108 is moving in the forward direction at a moderate speed and the area 162 selected to create the vector-based video presented on the display 150 is generally forward of the vehicle, as was the case in each of FIGS. 11-14. However, when the vehicle is turning (or about to turn) toward the left, the signals sent to the display controller 130 modifies the commands that it transmits to the camera controller 110. In response to those commands, a different portion 162 of the 360-degree horizonal stitched video composite 160 is selected to create the vector-based video (compare FIG. 16 to FIG. 15). This selected portion 162 is then streamed back to the display controller and ultimately displayed on the display 150. In FIG. 16, the area 160 is broader and extends rearwardly and to the left of the vehicle. In a similar fashion and as shown in FIG. 17, when the vehicle is turning (or about to turn) to the right, the portion 162 of the 360-degree horizonal stitched composite 160 displayed is altered such that the angle is broader and extends to the right and rearward of the vehicle. Altering what is displayed in this fashion is particularly helpful and provides additional safety when, for example, the drive of the vehicle wishes to change lanes, exit a freeway, travel around a curve, or execute a turn.

As shown in FIG. 10, the system also includes a forward/reverse sensor 156. Signals from this sensor, too, are used by the system of the present invention to anticipate a change in the directional component of the vehicle's vector. This sensor sends signals to the display controller 130, which modifies the commands being sent to the camera controller 110 and, in response to those commands, the camera controller 110 alters the portion 162 of the 360-degree horizonal stitched composite 160 used to create the vector-based video, which it sends back to the video controller 130 for display on display 150. When the vehicle is stopped or moving very slowly in the forward direction, the portion displayed is represented by the area 162 in FIG. 19. When the vehicle is in reverse, the portion displayed is represented by area 162 in FIG. 18.

The speed components of the vehicle's vector may be ascertained from signals generated by a speedometer or speed sensor 154. Such signals are sent by sensor 154 to the display controller 130, which are used by the display controller 130 to again change the commands being sent by the display controller 130 to the camera controller 110. Based on these commands, the camera controller selects and transmits back to the display controller a selected portion 162 of the 360-degree horizonal stitched composite 160 as vector-based video.

Figure 19:
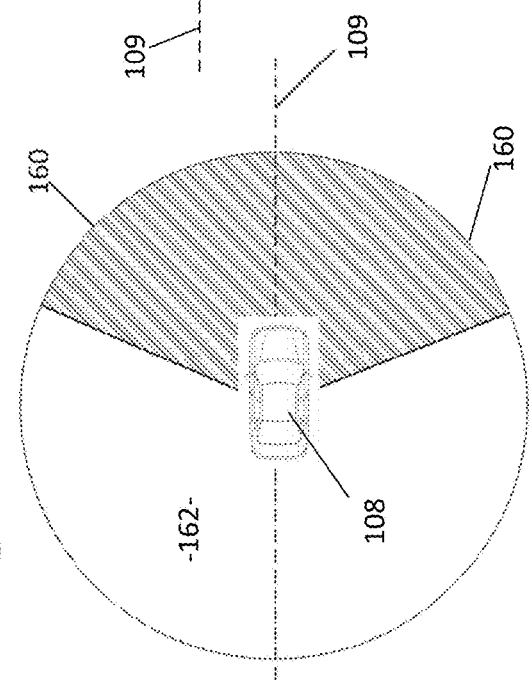
Figure 20:
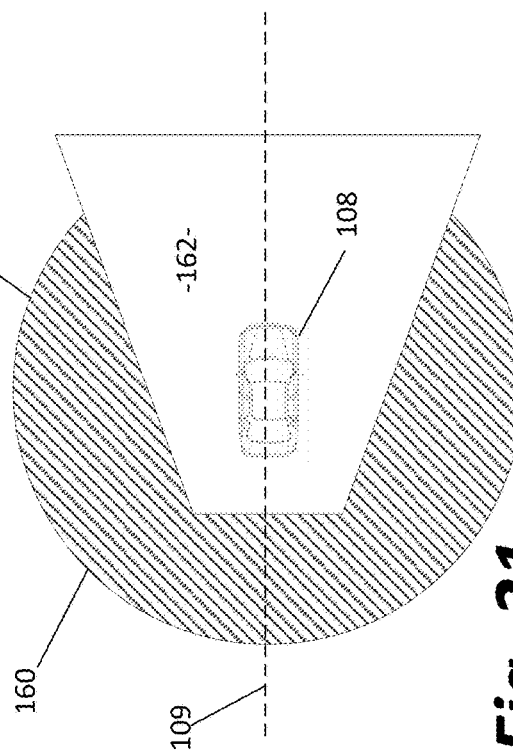
FIGS. 20 and 21 show how the selected portion of the 360-degree horizonal stitched composite video is modified as the vehicle accelerates.
Figure 21:
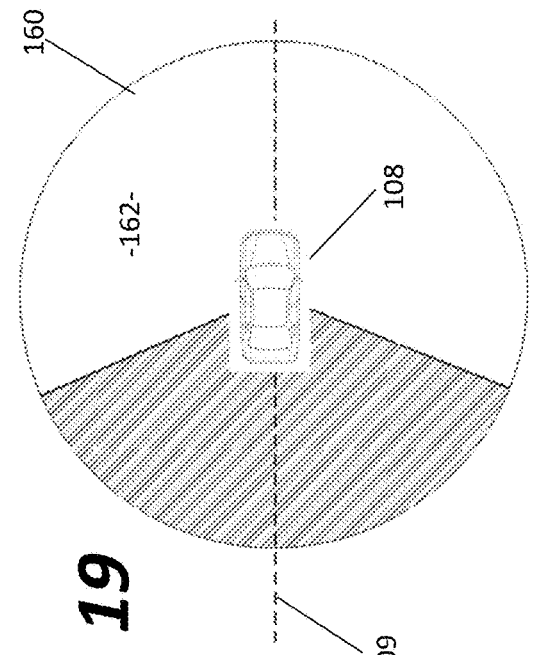

As mentioned above, when the vehicle is at a standstill or moving very slowly in the forward direction, the displayed vector-based video is very wide (more than 180 degrees) as shown in FIG. 19. As the vehicle accelerates to a moderate speed (45 mph), the vector-based video changes in two material respects. First, the angle narrows. Compare FIG. 19 to FIGS. 20 and 21. Also, note that in FIG. 19 what is viewed is from the perspective of approximately the center of the vehicle, but in FIG. 20, what is viewed extends backward to a location nearer the rear of the vehicle. Likewise, as acceleration continues to highway speeds (e.g., 65 mph), as shown in FIG. 21 even a narrower portion 162 of the 360-degree horizonal stitched composite 160 is selected and displayed and what is displayed is from a perspective to the rear of the vehicle. As referenced above, what is displayed can include an image of the vehicle, as illustrated in FIGS. 4-7. FIG. 6 corresponds to what one might see on the display when the portion selected corresponds to FIG. 21.

One more sensor is shown in FIG. 10, specifically airbag sensor 152. When an airbag is deployed for any reason (typically due to the vehicle being in an accident), this sensor sends a signal to the display controller, which is used by the CPU 132 to generate a command to save and not overwrite either the 360-degree horizonal stitched composite 160 or the vector-based video that have been displayed over some prior predetermined time period, such as the last 30 seconds. This command is issued to the camera controller 110 and the CPU 114 of the camera controller 110 moves that time-based segment of the 360-degree horizonal stitched composite 160 to an archive location in storage 120. At the same time, the vector-based video that was transmitted by the camera controller 110 to the display controller 130 during this time period is also stored for archival purposes. This may occur in the storage 120 of the camera controller 110 or the storage 138 of the display controller 130 or both. Assuming that the system remains operational, the system also enters a sub-routine in which the entire 360-degree horizonal stitched composite 160, for either a predetermined period of time or until storage in both storage 120 and storage 138 are no longer available, is archived.

As should be clear from the foregoing, data processing is distributed between the camera controller 110 and the display controller 130. The manner in which processing is distributed can, of course, be altered without deviating from the invention. For example, rather than the display controller 130 processing the signals from the various sensors to generate commands, it may simply forward those signals to the camera controller such that the camera controller is primarily responsible for selecting the portion 162 of the 360-degree horizonal stitched composite 160 to be used to create the vector-based video forwarded to the display controller 130 and displayed on display 150. Likewise, the camera controller 110 can simply forward the entire 360-degree horizonal stitched composite video feed 160 to the display controller 130 and the display controller 130 then selects the portion 162 used to create and display the vector-based video without further assistance from the camera controller 110. While such modifications may be made without deviating from the invention, the inventor believes that the system initially described offers an important advantage, namely, streaming only the vector-based video from camera controller 110 to display controller 130 will require less bandwidth than streaming the entire 360-horizonal degree stitched composite 160.

As noted above, other sensors may be employed. For example, proximity sensors or even signals generated by an adaptive cruise control system may be sent to the display controller, processed and used to automatically alter the portion 162 of the 360-degree horizonal composite selected. Further, while the display 150 and display controller are shown as separate components, they may be used or mounted together to the vehicle's dashboard.

This invention has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment and operating procedures, can be accomplished without departing from the scope of the invention itself.

What is claimed is:

1. A video system for a vehicle comprising:
a plurality of video cameras mounted to a vehicle so that video cameras placed adjacent to each other have overlapping fields of view;
a video display; and
a controller adapted to, in real time, simultaneously receive a raw video stream comprising a plurality of frames from each of said video cameras, calibrate and synchronize the raw video streams from the plurality of cameras, ascertain the speed and direction of the vehicle to determine a vector for the vehicle, select a stitch pattern from a plurality of available stitch patterns based on the then current vector of the vehicle, apply the selected stitch pattern to the raw video streams to create a composite vector video comprising a plurality of frames, and transmit the composite vector video stream to the video display which displays the composite vector video in real time, wherein the controller selects from the plurality of available stitch patterns alternate stitch patterns used to create the composite vector video as the vector of the vehicle changes with transitions as the stitch pattern changes, wherein the stitch pattern selected when the vehicle is stopped results in composite vector video presented on the display from a first perspective above the vehicle showing an image representative of the vehicle and the area immediately surrounding the vehicle, wherein the stitch patterns selected when the vehicle is accelerating result in composite vector video presented on the display having a second perspective that becomes narrower, longer, and further back with respect to the vehicle as the vehicle accelerates, and wherein the stitch patterns selected when the vehicle is decelerating result in composite vector video presented on the display having a third perspective that becomes wider, shorter, and further forward with respect to the vehicle as the vehicle decelerates.

2. The video system of claim 1 wherein the raw video streams comprise individual frames and the controller is adapted to store individual frames sequentially such that each frame is stored for a predetermined time period.

3. The video system of claim 1 wherein the raw video streams are delivered by the cameras to the controller wirelessly.

4. The video system of claim 1 wherein the composite vector video includes a virtual representation of the vehicle.

5. The video system of claim 1 wherein the selected stitch pattern changes as the vehicle's vector changes.

6. The video system of claim 1 wherein the first raw video stream has distorted portions of frames representing a first selected portion of terrain surrounding the vehicle, wherein the second raw video stream has undistorted portions of frames representing the first selected portion of terrain, and wherein the stitch pattern employed replaces distorted portion of the frames of a first raw video stream with undistorted portions of the frames of a second raw video stream when creating the composite vector video.

* * * * *